United States Patent
Katoh

[11] Patent Number: 6,125,507
[45] Date of Patent: Oct. 3, 2000

[54] CLOSING DEVICE FOR COVERING MEMBER

[75] Inventor: Hideo Katoh, Kanagawa, Japan

[73] Assignee: Katoh Electrical Machinery Co., Ltd., Kanagawa, Japan

[21] Appl. No.: 09/076,535

[22] Filed: May 12, 1998

[30] Foreign Application Priority Data

May 15, 1997 [JP] Japan .................................. 9-125888

[51] Int. Cl.⁷ .................................................. E05D 11/10
[52] U.S. Cl. ................................ 16/329; 16/334; 16/337
[58] Field of Search .......................... 16/340, 329, 334, 16/337; 361/681, 682; 403/111, 103

[56] References Cited

U.S. PATENT DOCUMENTS

| | | | |
|---|---|---|---|
| 1,180,669 | 4/1916 | Oellrich | 296/92 |
| 1,211,186 | 1/1917 | Lee | 16/340 |
| 2,635,281 | 4/1953 | Feldberg | 16/276 |
| 5,075,929 | 12/1991 | Chung | 16/342 |
| 5,109,570 | 5/1992 | Okada et al. | 16/289 |
| 5,109,572 | 5/1992 | Park | 16/334 |
| 5,208,944 | 5/1993 | Lu | 16/278 |
| 5,269,047 | 12/1993 | Lu | 16/340 |
| 5,772,351 | 6/1998 | Ching | 403/111 |
| 5,913,351 | 6/1999 | Miura | 16/340 |

*Primary Examiner*—Anthony Knight
*Assistant Examiner*—Alison K. Pickard
*Attorney, Agent, or Firm*—Notaro & Michalos P.C.

[57] ABSTRACT

In order to provide a closing device for a covering member, which is smaller than a conventional device, can stably hold the covering member at a predetermined open angle, and is manufactured at low cost, the closing device comprises: a rotary shaft having a flange part and a means to be fixed to the covering member side; a guide plate which is rotatably retained by a side facing the flange part of the rotary shaft and has means to be fixed to the device body; a first click plate fixed to the guide plate so as to be rotatable around the rotary shaft together with the guide plate; a second click plate which is in contact with the first click plate and is attached to the rotary shaft so as to be non-rotatable and slidable in the axial direction; and a compression means compressedly arranged between the second click plate and the flange part in order to press toward the first click plate side.

8 Claims, 4 Drawing Sheets

CLOSING DEVICE FOR COVERING MEMBER

BACKGROUND OF THE INVENTION

1. Field of the Invention

The present invention relates to a closing device for a covering member preferable for use in a small OA or electronic device such as a notebook-sized personal computer, a portable telephone, or the like.

2. Related Art

Hitherto, as a closing device which can open and close a display body of a small OA (office automation equipment) device such as a notebook-sized personal computer for a keyboard body and can stably stop and hold the display body at a predetermined open angle to the keyboard body, such as shown in U.S. Pat. No. 5,138,743 granted Aug. 18, 1992 and Japanese patent application no. 4-167466 (laid open no. 6-10556 a closing device is known in which a rotary shaft for supporting the covering member is rotatably attached to an attaching member which is attached to the device body side, a fixed cam member having a cam part in which the rotary shaft is rotatably inserted into the center part is fixed to the attaching member, and there are provided a rotating and sliding cam member which has a cam part which comes into contact with the cam part of the fixed cam member and is attached to the rotary shaft so as to be rotatable together with the rotary shaft and to be slidable in the axial direction and compression means for pressing the rotating and sliding cam member to the fixed cam member side.

Although the conventional known closing device has a function of sufficiently stably holding the covering member such as a display body at a predetermined angle, it is limited to reduce the size of the device since the cam member requires the thickness for the cam part. There is also a problem that a die for molding the cam member is necessary so that manufacturing costs are high.

SUMMARY OF THE INVENTION

It is an object of the invention to provide a closing device for a covering member preferable for use in a portable telephone or an electronic device such as a small OA device, which is smaller than a conventional closing device, can stably hold a covering member at a predetermined open angle, and is manufactured at low costs.

In order to achieve the object, according to the invention, a closing member is characterized by comprising: a rotary shaft having a flange part and a means to be fixed to the covering member; a guide plate which is rotatably retained by a side facing the flange part of the rotary shaft and has a means to be fixed to the device body side; a first click plate fixed to the guide plate so as to be rotatable around the rotary shaft together with the quide plate; a second click plate which comes into contact with the first click plate and is attached to the rotary shaft so as to be non-rotatable and slidable in the axial direction; and compression means compressedly provided between the second click plate and the flange part in order to press toward the first click plate side.

According to the invention, a closing member is characterized by comprising: a rotary shaft having a flange part and a means to be fixed to the covering member; a guide plate which is rotatably retained by a side facing the part of the rotary shaft and has a means to be fixed to the device body side; a first click plate fixed to the guide plate so as to be rotatable around the rotary shaft together with the guide plate; a second click plate which comes into contact with the first click plate and is attached to the rotary shaft so as to be non-rotatable and slidable in the axial direction; compression means compressedly provided between the second click plate and the flange part in order to press toward the first click plate side; and a cap attached to the guide plate side of the rotary shaft.

According to the invention, the first click plate can be constructed by a plate having one or a plurality of notches or small holes and the second click plate can be constructed by a plate having one or a plurality of projections which are fit into the notches or the small holes.

According to the invention, further, the means for retaining the guide plate by the rotary shaft can be constructed by an E-ring or a push nut engaged with the rotary shaft.

Other and further objects, features and advantages of the invention will appear more fully from the following description.

DETAILED DESCRIPTION OF THE PREFERRED EMBODIMENTS

Figure 1:
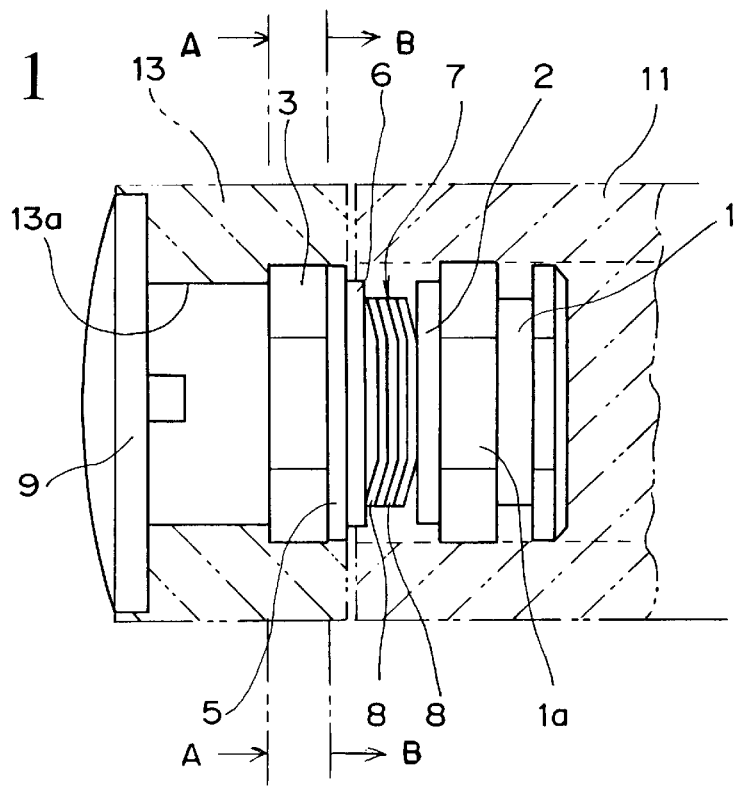
FIG. 1 is a front view of a closing device for a covering member according to the invention.
Figure 2:
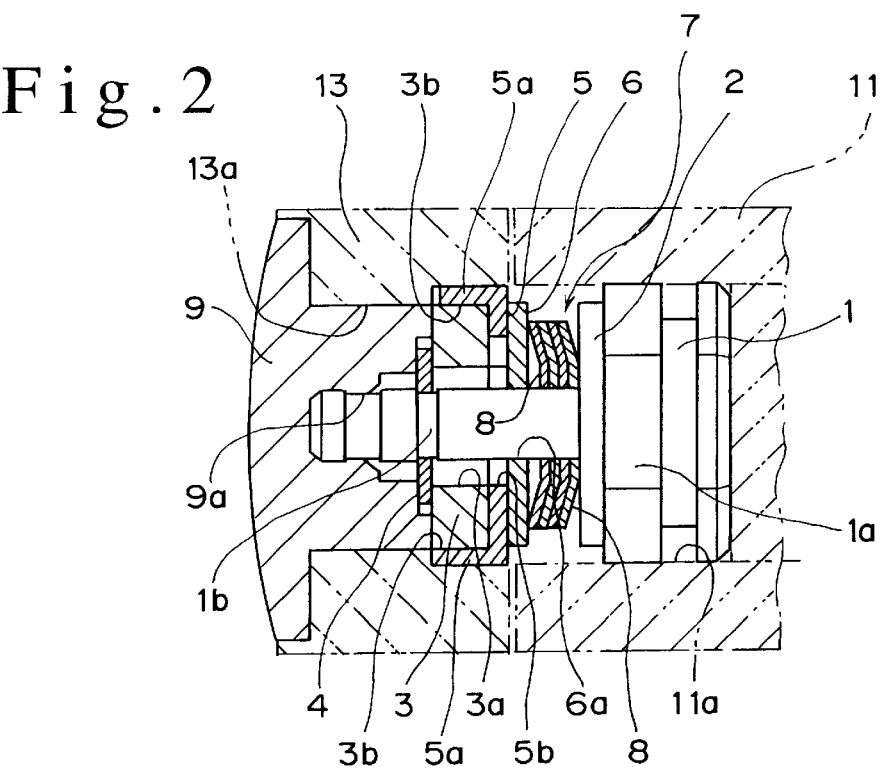
FIG. 2 is a front cross section of the closing device for the covering member according to the invention.
Figure 3:
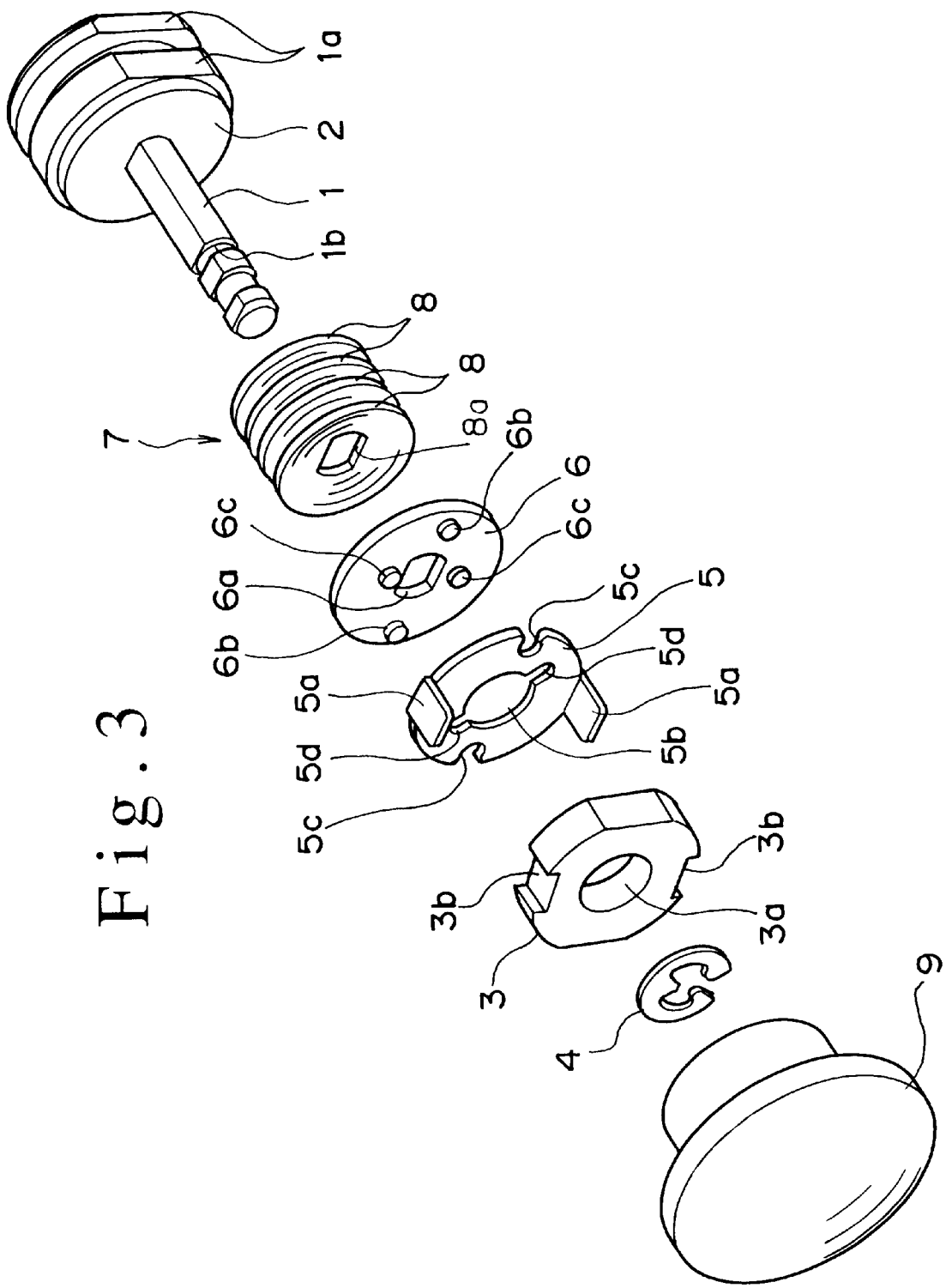
FIG. 3 is an exploded perspective view of the closing device for the covering member according to the invention.
Figure 4:
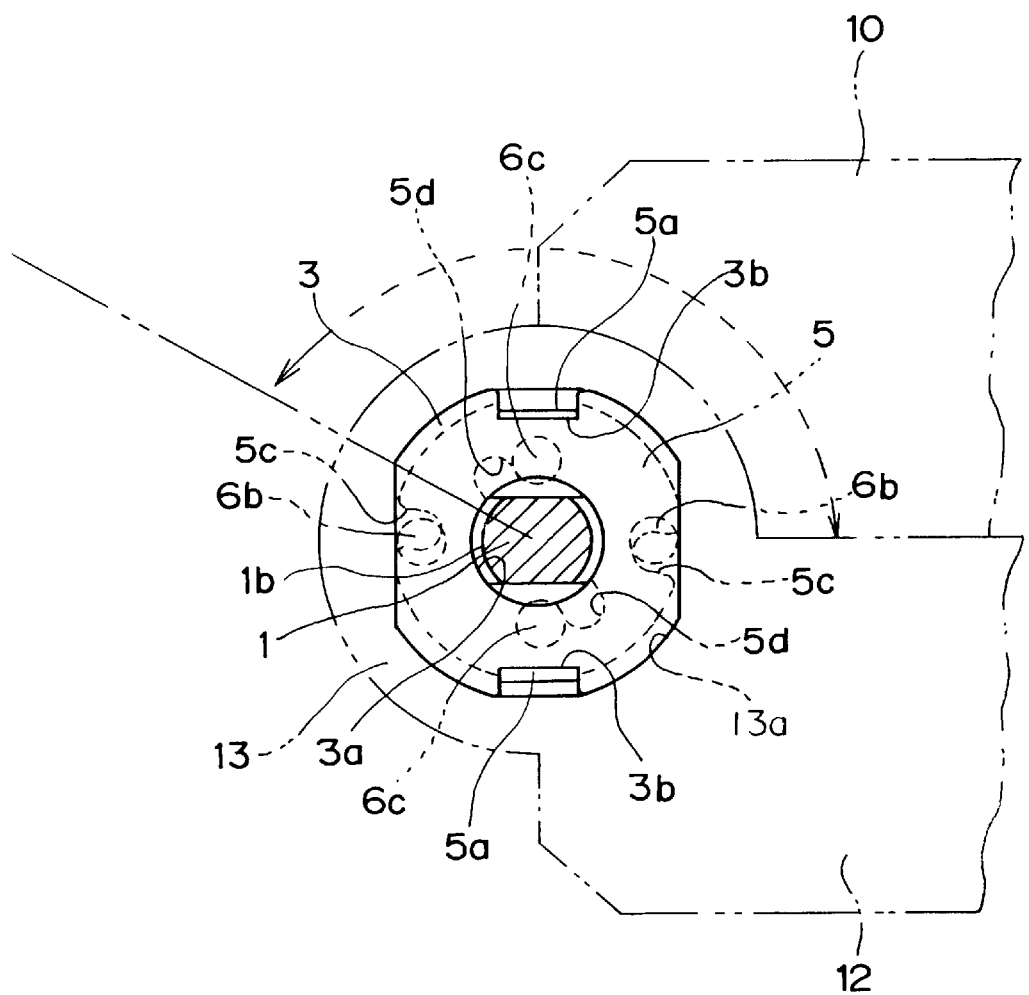
FIG. 4 is a cross section taken on line A—A of FIG. 3.

FIGS. 1 to 6 show an embodiment of the invention. Reference numeral 1 denotes a rotary shaft having one side on which a flange 2 is formed. The rotary shaft 1 has an attaching part 1a which is adjacent to the flange 2 and has an almost oval shape in cross section in which front and rear parts are notched. The attaching part 1a is fit into a deformed attaching hole 11a having an almost oval shape in cross section opened in an attaching part 11 of a covering member 10, shown by imaginary lines, thereby fixing the rotary shaft 1 to the covering member 10 side. Reference numeral 3 is a guide plate in which the rotary shaft 1 is rotatably inserted into a bearing hole 3a of a circular shape in cross section opened in the center and which is retained by a side opposite to the flange 2 by an E-ring 4 retained by a circumferential groove 1b formed in the rotary shaft 1. By notching the front and rear sides of the guide plate 3, the guide plate 3 has similarly an almost oval shape. By fitting the guide plate 3 into a deformed attaching hole 13a of an almost oval shape in cross section opened in an attaching part 13 of a device body 12 shown by imaginary lines, the guide plate 3 is fixed to the device body 12 side. A click plate 5 having an almost circular shape is attached onto the side face on the flange 2 side of guide plate 3 by retaining a pair of retaining members 5a, 5a formed by bending facing outer peripheral parts of the click plate 5 in retaining grooves 3b, 3b formed on the outer circumference of the guide plate, and the rotary shaft 1 is rotatably inserted into an insertion hold 5a b having a circular shape in cross section formed in the center of the click plate 5. The first click plate 5 has notches 5c, 5c in facing positions on the outer circumference and notches 5d, 5d in facing positions on the inner circumference.

A second click plate 6 of an almost circular shape is provided in contact with a side face of the first click plate 5 and has a deformed insertion hole 6a having an almost oval shape opened in the center part of the second click plate 6, into which the rotary shaft 1 is inserted. The second click plate 6 is retained by the rotary shaft 1 slidably in the axial direction. On the side facing the first click plate 5 of the second click plate 6, pairs of projections 6b, 6b and 6c, 6c are formed by press work in facing positions in the outer circumferential part and the inner circumferential part, respectively. The setting positions of the projections 6b, 6b and 6c, 6c are determined so as to be fit into the notches 5c, 5c and 5d, 5d, respectively, by the rotation of the second click plate 6 with respect to the first click plate 5. Reference numeral 7 is a compression means consisting of a plurality (four in the embodiment, but the number is not limited) of Belleville springs 8, 8, . . . and is compressedly provided between the flange 2 and the second click plate 6 while the rotary shaft 1 is inserted into deformed insertion holes 8a, 8a, . . . each having an almost oval shape in cross section opened in the center. Although not shown, a lubricating material such as silicon grease is applied between the first click plate 5 and the second click plate 6. A spring washer can be also used as the Belleville spring.

Reference numeral 9 denotes a cap which is attached to the rotary shaft 1 by forcing the end of the rotary shaft 1 into a retaining hole 9a opened in the axial direction in the center on one end.

Figure 5:
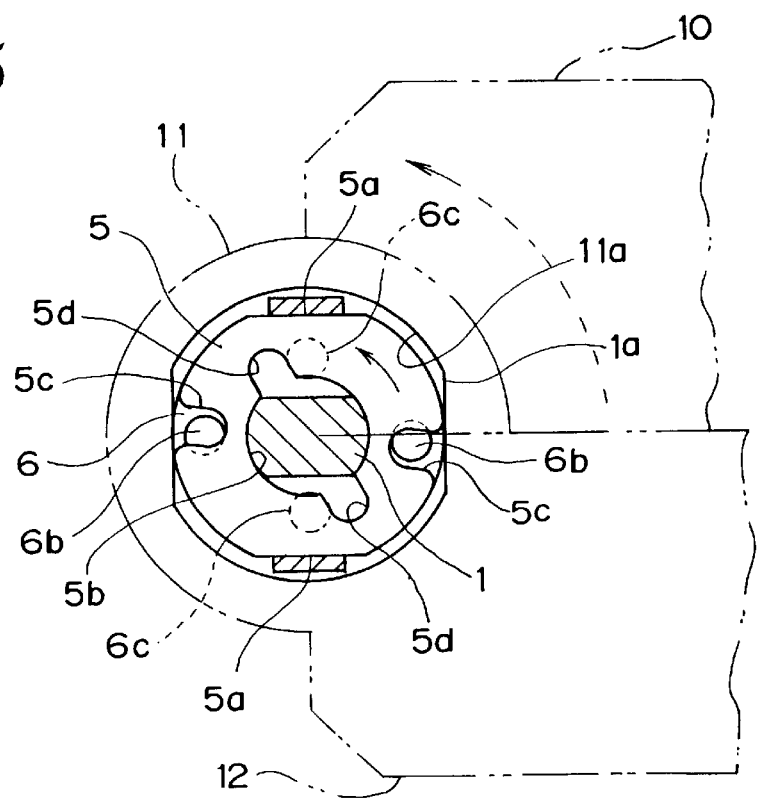
FIG. 5 is a cross section taken on line B—B of FIG. 3.
Figure 6:
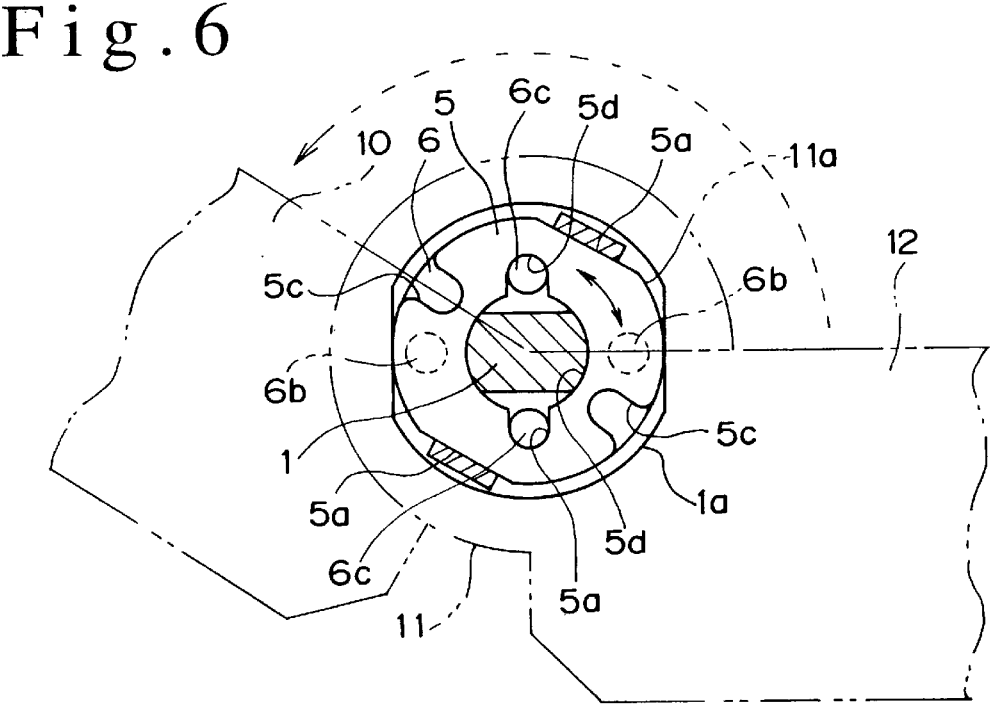
FIG. 6 is a cross section seen from the direction of line B—B of FIG. 3 when a guide plate is turned by 150°.

When the covering member 10 is closed to the device body 12 as shown in FIG. 5, a part of each of the projections 6b, 6b of the second click plate 6 is fit into each of the notches 5c, 5c in the outer circumferential part of the first click plate 5 and the second click plate 6 is pressed to the first click plate 5 side by the compression means 7, so that the covering member 10 keeps a stable closing state to the device body 12 and is not naturally open. When the covering member 10 is opened from the above state, the projections 6b, 6b of the second click plate 6 are escaped from the notches 5c, 5c of the first click plate 5 against the pressing force of the compression means 7, the covering member 10 is opened. After that, the covering member 10 is opened at an open angle without being naturally closed in a freely stopping manner by a friction torque generated by the pressing force of the compression means 7 for pressing the second click plate 6 to the first click plate 5 side. When the open angle of the covering member 10 reaches 150° as shown in FIG. 6, the projections 6c, 6c of the second click plate 6 are retained in the notches 5d, 5d of the first click plate 5, thereby clicking and stopping the covering member 10 and stably holding the position. The covering member 10 and the device body 12 can be further opened beyond the click stop position. When the covering member 10 is closed, the projections 6c, 6c of the second click plate 6 escape from the notches 5d, 5d of the first click plate 5 and the covering member 10 is closed in a freely stopped manner. By the dropping force of the projection 6b, 6b of the second click plate 6 into the notches 5c, 5c of the first click plate 5 near the close position, the covering member 10 is closed as if it is attracted and is kept in a stably held state at the close position.

With respect to each of the first and second click plates according to the invention, except for the point that it has a plate shape, a small hole or a recessed part can be also formed instead of the notch, and setting positions, the number of the notches and the projections, and the like are not limited. A spring washer can be also used as the Belleville spring. A push nut can be used as the E-ring. When a pair of the closing devices according to the invention are used, the click force and the number of click positions can be increased, and moreover, occurrence of rattle can be prevented by changing the setting position of the click plate of each of the closing devices to the circumferential direction. Further, although the case where the rotary shaft and the guide plate are relatively rotated at the time of use has been described in the embodiment, obviously, it is also possible that one of them is fixed and the other is rotated.

Having described our inventions as related to the embodiment shown in the accompanying drawing, it is our intention that the invention be not limited by any of the details of description, unless otherwise specified, but rather be construed broadly within its spirit and scope as set out in the accompanying claims.

What is claimed is:

1. A closing device for a covering member of a device body, comprising:

a rotary shaft having a flange part is provided with a rotation stopping means formed on an outer periphery on the flange, said rotation stopping means adapted to be inserted in an attaching hole of the covering member and engaged with the attaching hole;

a guide plate rotatably mounted on said rotary shaft having a second rotation stopping means formed on an outer periphery of the guide plate, said second rotation stopping means adapted to be inserted in a device attaching hole of the device body and engaged with the device attaching hole;

a first click plate fixed to said guide plate so as to be rotatable around said rotary shaft together with the guide plate;

a second click plate in contact with the first click plate and attached to said rotary shaft so as to rotate with the rotary shaft and slidable in the axial direction of the rotary shaft; and a compression means compressedly arranged between the second click plate and said flange part in order to press toward said first click plate;

wherein at least one notch or small hole is formed in said first click plate and projections are formed in said second click plate, so that when the rotary shaft is rotated, the projections are escaped from the at least one notch or small hole, and then the projections are abutted against the first click plate in a pressure manner for generating a friction torque.

2. A closing device for a covering member of a device body, comprising:

a rotary shaft having a flange part is provided with a rotation stopping means formed on an outer periphery on the flange, said rotation stopping means adapted to be inserted in an attaching hole of the covering member and engaged with the attaching hole;

a guide plate rotatably mounted on said rotary shaft having a second rotation stopping means formed on an outer periphery of the guide plate, said second rotation stopping means adapted to be inserted in a device attaching hole of the device body and engaged with the device attaching hole;

a first click plate fixed to said guide plate so as to be rotatable around said rotary shaft together with the guide plate;

a second click plate in contact with the click plate and attached to said rotary shaft so as to rotate with the rotary shaft and slidable in the axial direction of the rotary shaft; and a compression means compressedly arranged between the second click plate and said flange part in order to press toward said first click plate; and a cap attached to said guide plate side of said rotary shaft;

wherein at least one notch or small hole is formed in said first click plate and projections are formed in said second click plate, so that when the rotary shaft is rotated, the projections are escaped from the at least one notch or small hole, and then the projections are abutted against the first click plate in a pressure manner for generating a friction torque.

3. A closing device for a covering member of a device body, comprising:

a rotary shaft having a flange part is provided with a rotation stopping means formed on an outer periphery on the flange, said rotation stopping means adapted to be inserted in an attaching hole of the covering member and engaged with the attaching hole;

a guide plate rotatably mounted on said rotary shaft having a second rotation stopping means formed on an outer periphery of the guide plate, said second rotation stopping means adapted to be inserted in a device attaching hole of the device body and engaged with the device attaching hole;

a first click plate fixed to said guide plate so as to be rotatable around said rotary shaft together with the guide plate;

a second click plate in contact with the first click plate and attached to said rotary shaft so as to rotate with the rotary shaft and slidable in the axial direction of the rotary shaft; and a compression means consisting of a plurality of Bellevill springs and compressedly arranged between the second click plate and said flange part in order to press toward said first click plate;

wherein at least one notch or small hole is formed in said first click plate and projections are formed in said second click plate, so that when the rotary shaft is rotated, the projections are escaped from the at least one notch or small hole, and then the projections are abutted against the first click plate in a pressure manner for generating a friction torque.

4. A closing device for a covering member of a device body, comprising:

a rotary shaft having flange part is provided with a rotation stopping means formed on an outer periphery on the flange, said rotation stopping means adapted to be inserted in an attaching hole of the covering member and engaged with the attaching hole;

a guide plate rotatably mounted on said rotary shaft having a second rotation stopping means formed on an outer periphery of the guide plate, said second rotation stopping means adapted to be inserted in a device attaching hole of the device body and engaged with the device attaching hole;

a first click plate fixed to said guide plate so as to be rotatable around said rotary shaft together with the guide plate;

a second click plate in contact with the first click plate and attached to said rotary shaft so as to rotate with the rotary shaft and slidable in the axial direction of the rotary shaft; and a compression means compressedly arranged between the second click plate and said flange part in order to press toward said first click plate; and an E-ring or a push nut engaged with said rotary shaft for retaining said guide plate;

wherein at least one notch or small hole is formed in said first click plate and projections are formed in said second click plate, so that when the rotary shaft is rotated, the projections are escaped from the at least one notch or small hole, and then the projections are abutted against the first click plate in a pressure manner for generating a friction torque.

5. A closing device for a covering member of a device body, comprising:

a rotary shaft having a flange part is provided with a rotation stopping means formed on an outer periphery on the flange, said rotation stopping means adapted to be inserted in an attaching hole of the covering member and engaged with the attaching hole;

a guide plate rotatably mounted on said rotary shaft having a second rotation stopping means formed on an outer periphery of the guide plate, said second rotation stopping means adapted to be inserted in a device attaching hole of the device body and engaged with the device attaching hole;

a first click plate fixed to said guide plate so as to be rotatable around said rotary shaft together with the guide plate;

a second click plate in contact with the first click plate and attached to said rotary shaft so as to rotate with the rotary shaft and slidable in the axial direction of the rotary shaft; and a compression means consisting of a plurality of Belleville springs and compressedly arranged between the second click plate and said flange part in order to press toward said first click plate; and a cap attached to said guide plate side of said rotary shaft;

wherein at least one notch or small hole is formed in said first click plate and projections are formed in said click plate, so that when the rotary shaft is rotated, the projections are escaped from the at least one notch or small hole, and then the projections are abutted against the first click plate in a pressure manner for generating a friction torque.

6. A closing device for a covering member of a device body, comprising:

a rotary shaft having a flange part is provided with a rotation stopping means formed on an outer periphery on the flange, said rotation stopping means adapted to be inserted in an attaching hole of the covering member and engaged with the attaching hole;

a guide plate rotatably mounted on said rotary shaft having a second rotation stopping means formed on an outer periphery of the guide plate, said second rotation stopping means adapted to be inserted in a device attaching hole of the device body and engaged with the device attaching hole;

a first click plate fixed to said guide plate so as to be rotatable around said rotary shaft together with the guide plate;

a second click plate in contact with the first click plate and attached to said rotary shaft so as to rotate with the rotary shaft and slidable in the axial direction of the rotary shaft; and a compression means consisting of a plurality of Belleville springs and compressedly arranged between the second click plate and said flange part in order to press toward said first click plate; and a cap attached to said guide plate side of said rotary shaft; and E-ring or a push nut engaged with said rotary shaft for retaining said guide plate;

wherein at least one notch or small hole is formed in said first click plate and projections are formed in said click plate, so that when the rotary shaft is rotated, the projections are escaped from the at least one notch or small hole, and then the projections are abutted against the first click plate in a pressure manner for generating a friction torque.

7. A closing device for a covering member of a device body, comprising:

a rotary shaft having a flange part is provided with a rotation stopping means formed on an outer periphery on the flange, said rotation stopping means adapted to be inserted in an attaching hole of the covering member and engaged with the attaching hole;

a guide plate rotatably mounted on said rotary shaft having a second rotation stopping means formed on an outer periphery of the guide plate, said second rotation stopping means adapted to be inserted in a device attaching hole of the device body and engaged with the device attaching hole;

a first click plate fixed to said guide plate so as to be rotatable around said rotary shaft together with the guide plate;

a second click plate in contact with the first click plate and attached to said rotary shaft so as to rotate with the rotary shaft and slidable in the axial direction of the rotary shaft; and a compression means consisting of a plurality of Belleville springs and compressedly arranged between the second click plate and said flange part in order to press toward said first click plate; and an E-ring or a push nut engaged with said rotary shaft for retaining said guide plate;

wherein at least one notch or small hole is formed in said first click plate and projections are formed in said click plate, so that when the rotary shaft is rotated, the projections are escaped from the at least one notch or small hole, and then the projections are abutted against the first click plate in a pressure manner for generating a friction torque.

8. A closing device for a covering member of a device body, comprising:

a rotary shaft having a flange part is provided with a rotation stopping means formed on an outer periphery on the flange, said rotation stopping means adapted to be inserted in an attaching hole of the covering member and engaged with the attaching hole;

a guide plate rotatably mounted on said rotary shaft having a second rotation stopping means formed on an outer periphery of the guide plate, said second rotation stopping means adapted to be inserted in a device attaching hole of the device body and engaged with the device attaching hole;

a first click plate fixed to said guide plate so as to be rotatable around said rotary shaft together with the guide plate;

a second click plate in contact with the first click plate and attached to said rotary shaft so as to rotate with the rotary shaft and slidable in the axial direction of the rotary shaft; and a compression means compressedly arranged between the second click plate and said flange part in order to press toward said click plate; and a cap attached to said guide plate side of said rotary shaft; and an E-ring or a push nut engaged with said rotary shaft for retaining said guide plate;

wherein at least one notch or small hole is formed in said first click plate and projections are formed in said click plate, so that when the rotary shaft is rotated, the projections are escaped from the at least one notch or small hole, and then the projections are abutted against the first click plate in a pressure manner for generating a friction torque.

* * * * *